United States Patent
Tsuda (10) Patent No.: US 11,942,973 B2
(45) Date of Patent: Mar. 26, 2024

(54) RADIO FREQUENCY MODULE AND COMMUNICATION DEVICE

(71) Applicant: Murata Manufacturing Co., Ltd., Nagaokakyo (JP)

(72) Inventor: Motoji Tsuda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 271 days.

(21) Appl. No.: 17/671,591

(22) Filed: Feb. 15, 2022

(65) Prior Publication Data

US 2022/0173754 A1 Jun. 2, 2022

Related U.S. Application Data

(63) Continuation of application No. PCT/JP2020/025027, filed on Jun. 25, 2020.

(30) Foreign Application Priority Data

Aug. 28, 2019 (JP) .................. 2019-155823

(51) Int. Cl.
*H04B 1/00* (2006.01)
*H04B 1/04* (2006.01)
*H04B 1/44* (2006.01)

(52) U.S. Cl.
CPC ........... *H04B 1/0067* (2013.01); *H04B 1/006* (2013.01); *H04B 1/04* (2013.01); *H04B 2001/0408* (2013.01)

(58) Field of Classification Search
CPC ........ H04B 1/006; H04B 1/0067; H04B 1/04; H04B 2001/0408; H04B 1/0475; H04B 1/10; H04B 1/16; H04B 1/40; H04B 1/44
See application file for complete search history.

(56) References Cited

U.S. PATENT DOCUMENTS 8,391,821 B2 * 3/2013 Okabe .................. H04B 1/38
455/553.1
8,546,980 B2 * 10/2013 Shimamoto ............ H04B 1/525
307/109

(Continued)

FOREIGN PATENT DOCUMENTS

JP 2006-166277 A 6/2006
JP 2011-055241 A 3/2011

(Continued)

OTHER PUBLICATIONS

International Search Report and Written Opinion dated Sep. 8, 2020, received for PCT Application PCT/JP2020/025027, Filed on Jun. 25, 2020, 9 pages including English Translation.

(Continued)

*Primary Examiner* — Quochien B Vuong
(74) *Attorney, Agent, or Firm* — XSENSUS LLP (57) ABSTRACT

A radio frequency module includes a substrate, a power amplifier that amplifies a transmission signal in a first communication band, a power amplifier that amplifies a transmission signal in a second communication band, and a power amplifier that amplifies a transmission signal in a third communication band. Simultaneous transmission can be performed in a combination of the first communication band and the third communication band. Simultaneous transmission cannot be performed in a combination of the first communication band and the second communication band and a combination of the second communication band and the third communication band. In plan view of the substrate, a distance between the output terminals of the power amplifier and the power amplifier is longer than a distance between the output terminals of the power amplifier and the power amplifier and a distance between the output terminals of the power amplifier and the power amplifier.

19 Claims, 4 Drawing Sheets

(56) References Cited

U.S. PATENT DOCUMENTS

| | | | | |
|---|---|---|---|---|
| 8,644,197 | B2* | 2/2014 | Lee | H04B 1/0057 |
| | | | | 455/562.1 |
| 9,077,405 | B2* | 7/2015 | Jones | H04B 1/0458 |
| 2011/0050348 | A1* | 3/2011 | Makioka | H03F 3/24 |
| | | | | 330/295 |

FOREIGN PATENT DOCUMENTS

| | | |
|---|---|---|
| JP | 2017-17691 A | 1/2017 |
| JP | 2017-28699 A | 2/2017 |
| WO | 2019/004152 A1 | 1/2019 |
| WO | 2019/044704 A1 | 3/2019 |
| WO | 2019/065311 A1 | 4/2019 |
| WO | 2019/188968 A1 | 10/2019 |

OTHER PUBLICATIONS

English translation of Written Opinion dated Sep. 8, 2020, received for PCT Application PCT/JP2020/025027.

Office Action dated Dec. 13, 2022 in Korean Patent Application No. 10-2022-7001130, 9 pages.

\* cited by examiner

RADIO FREQUENCY MODULE AND COMMUNICATION DEVICE

CROSS-REFERENCE TO RELATED APPLICATIONS

The present application is a continuation application of International Patent Application No. PCT/JP2020/025027, filed Jun. 25, 2020, which claims priority to Japanese Patent Application No. 2019-155823, filed Aug. 28, 2019, the entire contents of each of which being incorporated herein by reference.

TECHNICAL FIELD

The present disclosure relates to a radio frequency module and a communication device.

BACKGROUND ART

In mobile communication devices such as mobile phones, the arrangement of circuit elements included in a radio frequency front-end circuit is increasingly complicated, especially in light of the progress being made in multiband communications.

For example, Patent Document 1 discloses an electronic module capable of simultaneously transmitting a plurality of radio frequency signals.

CITATION LIST

Patent Document

Patent Document 1: Japanese Unexamined Patent Application Publication No. 2017-17691

SUMMARY

Technical Problems

However, as recognized by the present inventor, in the electronic module disclosed in Patent Document 1, a plurality of radio frequency signals to be simultaneously transmitted are amplified by a plurality of power amplifiers disposed on the same substrate. Accordingly, there is a case where the multiple radio frequency signals interfere with each other and the isolation between transmission circuits deteriorates. Such a problem, as well as other problems, may also arise between reception circuits.

It is an aspect of the disclosure to provide a radio frequency module and a communication device with which the isolation between circuits for the simultaneous transmission and/or simultaneous reception of a plurality of radio frequency signals can be improved.

Solution to Problems

A radio frequency module according to an aspect of the disclosure includes a substrate, a first transmission amplifier that is mounted on the substrate and that amplifies a first transmission signal in a first communication band, a second transmission amplifier that is mounted on the substrate and that amplifies a second transmission signal in a second communication band, and a third transmission amplifier that is mounted on the substrate and that amplifies a third transmission signal in a third communication band. Circuitry is configured to enable simultaneous transmission in the first communication band and in the third communication band. Simultaneous transmission is prevented from being performed in the first communication band and the second communication band and prevented from being performed simultaneously in the second communication band and the third communication band. In plan view of the substrate, a distance between an output terminal of the first transmission amplifier and an output terminal of the third transmission amplifier is longer than a distance between the output terminal of the first transmission amplifier and an output terminal of the second transmission amplifier and a distance between the output terminal of the second transmission amplifier and the output terminal of the third transmission amplifier.

A communication device according to an aspect of the disclosure includes a signal processing circuit that processes a radio frequency signal that is to be transmitted or has been received by an antenna, and the radio frequency module. The radio frequency module transmits the radio frequency signal between the antenna and the signal processing circuit.

Advantageous Effects of the Disclosure

A radio frequency module according to an aspect of the disclosure can improve the isolation between circuits for the simultaneous transmission and/or simultaneous reception of a plurality of radio frequency signals.

DESCRIPTION OF EMBODIMENTS

Embodiments of the disclosure will be described in detail below. The embodiments to be described below represent comprehensive or concrete examples. The numerical values, shapes, materials, constituent elements, the arrangement and connection state of the constituent elements to be described in the following embodiments are merely illustrative examples, and are not intended to be limiting. Among the constituent elements included in the following embodiments and the following modifications, those not recited in the independent claims are described as optional constituent elements. The sizes or the ratio of sizes of the constituent elements illustrated in the drawings are not necessarily precise. Throughout the drawings, the same numeral is given to substantially the same element, and redundant description may be omitted or simplified.

In the following, a term that indicates a relation between elements such as "parallel" or "perpendicular", a term that indicates the shape of an element such as "rectangular", and a numerical range do not necessarily have only strict meanings, and also cover substantially equivalent ranges that include a difference of about several percent, for example.

In the following, regarding A, B, and C mounted on a substrate, "C is disposed between A and B in plan view of the substrate (or a principal surface of the substrate)" means a straight line connecting any point in A and any point in B passes through a region of C in the plan view of the substrate. Plan view of a substrate means that the substrate and a circuit element mounted on the substrate are viewed, being orthogonally projected onto a plane parallel to the substrate.

Embodiment

1. Circuit Configuration of Radio Frequency Module 1 and Communication Device 5

[1.1 Circuit Configuration of Communication Device 5]

Figure 1:
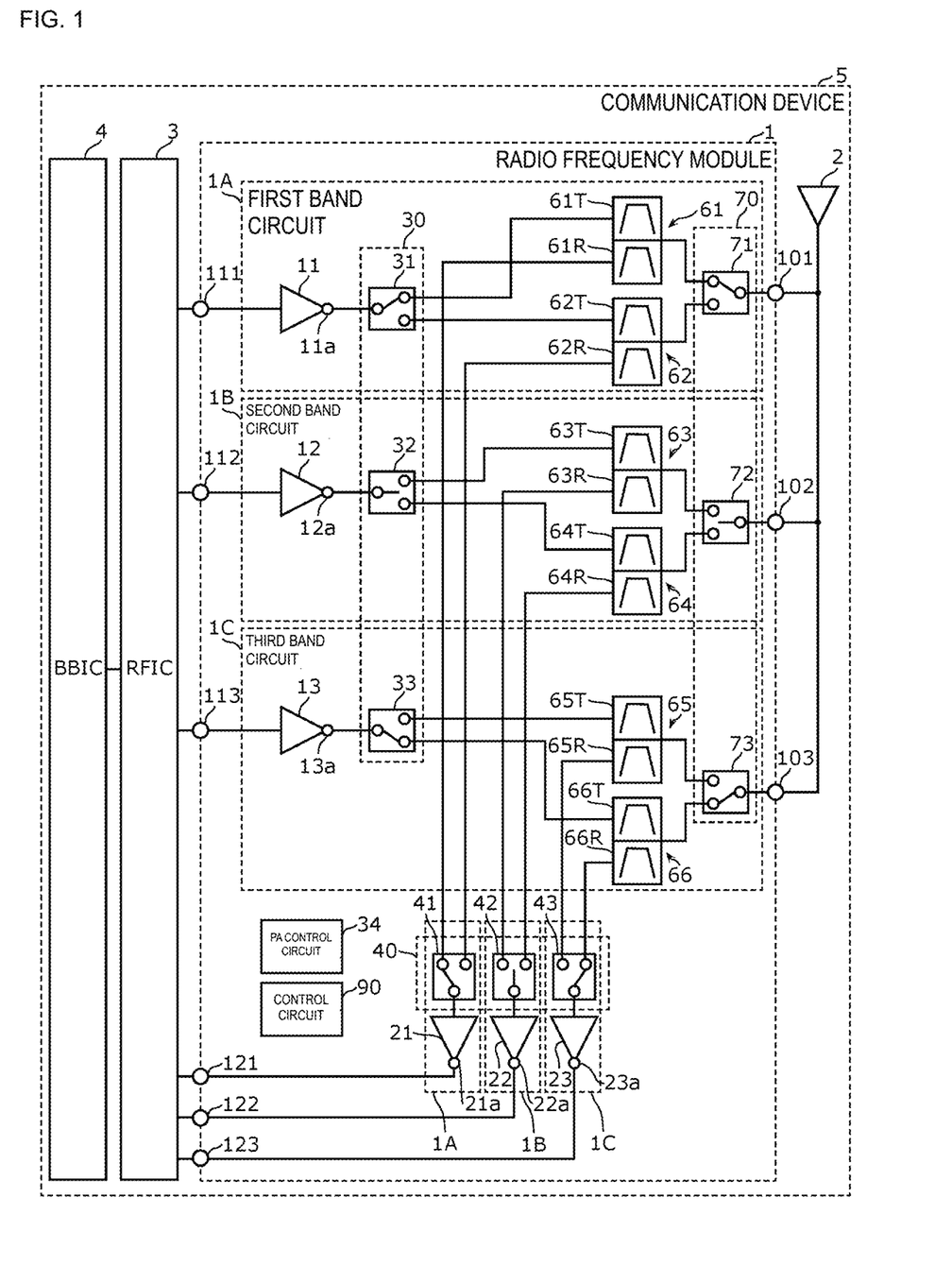
FIG. 1 is diagram illustrating the circuit configuration of a radio frequency module according to an embodiment and a communication device according to an embodiment.

FIG. 1 is a diagram illustrating the circuit configuration of a radio frequency module 1 according to a first embodiment and a communication device 5 according to the first embodiment. As illustrated in FIG. 1, the communication device 5 includes the radio frequency module 1, an antenna 2, a radio frequency integrated circuit (RFIC) 3, and a baseband integrated circuit (BBIC) 4.

The radio frequency module 1 conveys a radio frequency (RF) signal between the antenna 2 and the RFIC 3. The circuit configuration of the radio frequency module 1 will be described in detail below.

The antenna 2 is connected to antenna connection terminals 101, 102, and 103 of the radio frequency module 1, transmits a transmission signal output from the radio frequency module 1, and outputs an externally received reception signal to the radio frequency module 1.

The RFIC 3 is an example of a signal processing circuit (transceiver circuitry) that processes a radio frequency signal that is to be transmitted or has been received by the antenna 2. Specifically, the RFIC 3 performs signal processing such as downconversion upon a radio frequency reception signal input through a reception signal path in the radio frequency module 1 and outputs a reception signal generated as a result of the signal processing to the BBIC 4. The RFIC 3 performs signal processing such as upconversion upon a transmission signal input from the BBIC 4 and outputs a radio frequency transmission signal generate as a result of the signal processing to a transmission signal path in the radio frequency module 1.

The BBIC 4 is a baseband signal processing circuit that performs signal processing using an intermediate frequency band lower than the frequency band of a radio frequency signal passing through the radio frequency module 1. A signal processed by the BBIC 4 is used as, for example, an image signal for image display or an audio signal for conversation through a speaker.

The RFIC 3 also functions as a control unit (also referred to a controller or control circuitry) that controls the connections of switching circuits 30, 40, and 70 in the radio frequency module 1 on the basis of a communication band used. Specifically, the control unit transmits control signals for the connection switching of the switching circuits 30, 40, and 70 in the radio frequency module 1 to a control circuit 90 in the radio frequency module 1. The control unit transmits control signals for, for example, the adjustment of gains of power amplifiers (PAs) 11, 12, and 13 and low-noise amplifiers 21, 22, and 23 in the radio frequency module 1 to the control circuit 90 and a PA control circuit 34.

The PA control circuit 34 is an example of a controller that controls a first transmission amplifier, a second transmission amplifier, and a third transmission amplifier and, in this example, is a power amplifier controller that controls the power amplifiers 11, 12, and 13. The PA control circuit 34 outputs control signals to the power amplifiers 11, 12, and 13 upon receiving a control signal from the control unit.

The control circuit 90 outputs control signals to the switching circuits 30, 40, and 70 and the low-noise amplifiers 21, 22, and 23 upon receiving a control signal from the control unit. The control circuit 90 may include the PA control circuit 34. The control unit may be provided outside of the RFIC 3 and, for example, may be provided in the BBIC 4.

In the communication device 5 according to this embodiment, the antenna 2 and the BBIC 4 are optional features.

[1.2 Circuit Configuration of Radio Frequency Module 1]

Next, the configuration of the radio frequency module 1 will be described in detail below.

As illustrated in FIG. 1, the radio frequency module 1 includes the antenna connection terminals 101, 102, and 103, a first band circuit 1A, a second band circuit 1B, a third band circuit 1C, the PA control circuit 34, the control circuit 90, transmission input terminals 111, 112, and 113, and reception output terminals 121, 122, and 123.

The antenna connection terminals 101, 102, and 103 are connected to the antenna 2.

The first band circuit 1A transmits respective radio frequency signals (first transmission signals and first reception signals) in a plurality of first communication bands in a first communication band group. The second band circuit 1B transmits respective radio frequency signals (second transmission signals and second reception signals) in a plurality of second communication bands in a second communication band group. The third band circuit 1C transmits respective radio frequency signals (third transmission signals and third reception signals) in a plurality of third communication bands in a third communication band group.

Each of the first to third communication band groups is, for example, one of a low-band group, a middle-band group, and a high-band group. The first communication band group and the third communication band group may be the same communication band group. In this case, the second communication band group may be different from the first communication band group and the third communication band group. Alternatively, the first communication band group and the third communication band group may be different from each other. In this case, the second communication band group may be the same as one of the first communication band group and the third communication band group.

The low-band group is a frequency band group that includes, for example, the frequency range of 0.4 GHz to 1.0 GHz and includes a plurality of communication bands for 4G and 5G. The low-band group includes, as LTE (long term evolution) bands and NR (new radio) bands, for example, B5 and n5 (transmission band: 824 MHz to 849 MHz, reception band: 869 MHz to 894 MHz), B8 and n8 (transmission band: 880 MHz to 915 MHz, reception band: 925 MHz to 960 MHz), B28 and n28 (transmission band: 703 MHz to 748 MHz, reception band: 753 MHz to 803 MHz), and B71 and n71 (transmission band: 663 MHz to 698 MHz, reception band: 617 MHz to 652 MHz).

The middle-band group is a frequency band group including a plurality of communication bands for 4G and 5G. The middle-band group is located on the higher-frequency side of the low-band group and has, for example, the frequency range of 1.5 GHz to 2.2 GHz. The middle-band group includes, as LTE bands and NR bands, for example, B1 and n1 (transmission band: 1920 MHz to 1980 MHz, reception band: 2110 MHz to 2170 MHz), B3 and n3 (transmission band: 1710 MHz to 1785 MHz, reception band: 1805 MHz to 1880 MHz), B39 and n39 (transmission and reception bands: 1880 MHz to 1920 MHz), and B66 and n66 (transmission band: 1710 MHz to 1780 MHz, reception band: 2110 MHz to 2200 MHz).

The high-band group is a frequency band group including a plurality of communication bands for 4G and 5G. The high-band group is located on the higher-frequency side of the middle-band group and has, for example, the frequency range of 2.3 GHz to 2.8 GHz. The high-band group includes, as LTE bands and NR bands, for example, B7 and n7 (transmission band: 2500 MHz to 2570 MHz, reception band: 2620 MHz to 2690 MHz), B40 and n40 (transmission and reception bands: 2300 MHz to 2400 MHz), and B41 and n41 (transmission and reception bands: 2496 MHz to 2690 MHz).

In this example, simultaneous transmission and simultaneous reception can be performed in the combination of the first communication band and the third communication band. That is, the combination of the first communication band and the third communication band enables simultaneous transmission and simultaneous reception. At that time, it is not precluded that each of the first communication band and the third communication band is used alone.

Simultaneous transmission and simultaneous reception cannot be performed in the combination of the first communication band and the second communication band and the combination of the second communication band and the third communication band. That is, each of the combination of the first communication band and the second communication band and the combination of the second communication band and the third communication band forbids simultaneous transmission and simultaneous reception.

The availability of simultaneous transmission and simultaneous reception in these multiple communication bands is defined in advance by a standardizing organization such as 3GPP (3rd generation partnership project).

As the combination of the first communication band and the third communication band, for example, the combination of LTE bands can be used. Specifically, as the combination of the first communication band and the third communication band, for example, the combination of B1 and B3, the combination of B3 and B7, or the combination of B40 and B41 can be used.

As the combination of the first communication band and the third communication band, the combination of an LTE band and an NR band can also be used. Specifically, as the combination of the first communication band and the third communication band, for example, the combination of B3 and n3, the combination of B41 and n41, the combination of B71 and n71, or the combination of B1 and n41 can be used.

The above combinations of the first communication band and the third communication band are examples, and are optionally included in this exemplary embodiment. As the combination of the first communication band and the third communication band, the combination of NR bands may be used.

[1.2.1 Circuit Configuration of First Band Circuit 1A]

The circuit configuration of the first band circuit 1A will be described. The first band circuit 1A includes the power amplifier 11, the low-noise amplifier 21, duplexers 61 and 62, and switches 31, 41, and 71.

The power amplifier 11 is an example of the first transmission amplifier and is a transmission power amplifier that amplifies a transmission signal in the first communication band group. The low-noise amplifier 21 is an example of a first reception amplifier and is a reception low-noise amplifier that amplifies a reception signal in the first communication band group with low noise.

The duplexer 61 passes a radio frequency signal in one (hereinafter referred to as "communication band A") of the multiple first communication bands included in the first communication band group. The duplexer 61 includes a transmission filter 61T and a reception filter 61R.

The transmission filter 61T is disposed on a transmission path that connects the power amplifier 11 and the antenna connection terminal 101. The transmission filter 61T passes a transmission signal in the transmission band of the communication band A among transmission signals amplified by the power amplifier 11.

The reception filter 61R is disposed on a reception path that connects the low-noise amplifier 21 and the antenna connection terminal 101. The reception filter 61R passes a reception signal in the reception band of the communication band A among reception signals input from the antenna connection terminal 101.

The duplexer 62 passes a radio frequency signal in another one (hereinafter referred to as "communication band B") of the multiple first communication bands included in the first communication band group. The duplexer 62 includes a transmission filter 62T and a reception filter 62R.

The transmission filter 62T is disposed on a transmission path that connects the power amplifier 11 and the antenna connection terminal 101. The transmission filter 62T passes a transmission signal in the transmission band of the communication band B among transmission signals amplified by the power amplifier 11.

The reception filter 62R is disposed on a reception path that connects the low-noise amplifier 21 and the antenna connection terminal 101. The reception filter 62R passes a reception signal in the reception band of the communication band B among reception signals input from the antenna connection terminal 101.

The switch 31 is disposed on a transmission path that connects the power amplifier 11 and each of the transmission filters 61T and 62T and switches between the connection between the power amplifier 11 and the transmission filter 61T and the connection between the power amplifier 11 and the transmission filter 62T. The switch 31 is, for example, an SPDT (single-pole double-throw) switching circuit having a common terminal connected to the power amplifier 11, one of selection terminals connected to the transmission filter 61T, and the other selection terminal connected to the transmission filter 62T.

The switch 41 is disposed on a reception path that connects the low-noise amplifier 21 and each of the reception filters 61R and 62R and switches between the connection between the low-noise amplifier 21 and the reception filter 61R and the connection between the low-noise amplifier 21 and the reception filter 62R. The switch 41 includes, for example, an SPDT switching circuit having a common terminal connected to the low-noise amplifier 21, one of selection terminals connected to the reception filter 61R, and the other selection terminal connected to the reception filter 62R.

The switch 71 switches between the connection between the antenna 2 and the duplexer 61 and the connection between the antenna 2 and the duplexer 62. The switch 71 includes, for example, an SPDT switching circuit having a common terminal connected to the antenna connection terminal 101, one of selection terminals connected to the duplexer 61, and the other selection terminal connected to the duplexer 62. The switch 71 can disable the transmission of a radio frequency signal to the first band circuit 1A under a condition the common terminal thereof is connected to none of the selection terminals thereof. That is, the switch 71 may function as an antenna switch that switches between the connection and disconnection between the first band circuit 1A and the antenna 2.

In the first band circuit 1A, the number of supportable communication bands is not limited two, and may be one or three or more. The number of duplexers and the necessity or unnecessity of each switch are determined in accordance with the number of communication bands.

[1.2.2 Circuit Configuration of Second Band Circuit 1B]

Next, the circuit configuration of the second band circuit 1B will be described. The second band circuit 1B includes the power amplifier 12, the low-noise amplifier 22, duplexers 63 and 64, and switches 32, 42, and 72.

The power amplifier 12 is an example of a second transmission amplifier and is a transmission power amplifier that amplifies a transmission signal in the second communication band group. The low-noise amplifier 22 is an example of a second reception amplifier and is a reception low-noise amplifier that amplifies a reception signal in the second communication band group with low noise.

The duplexer 63 passes a radio frequency signal in one (hereinafter referred to as "communication band C") of the multiple second communication bands included in the second communication band group. The duplexer 63 includes a transmission filter 63T and a reception filter 63R. The transmission filter 63T is disposed on a transmission path that connects the power amplifier 12 and the antenna connection terminal 102 and passes a transmission signal in the transmission band of the communication band C among transmission signals amplified by the power amplifier 12. The reception filter 63R is disposed on a reception path that connects the low-noise amplifier 22 and the antenna connection terminal 102 and passes a reception signal in the reception band of the communication band C among reception signals input from the antenna connection terminal 102.

The duplexer 64 passes a radio frequency signal in one (hereinafter referred to as "communication band D") of the multiple second communication bands included in the second communication band group. The duplexer 64 includes a transmission filter 64T and a reception filter 64R.

The transmission filter 64T is disposed on a transmission path that connects the power amplifier 12 and the antenna connection terminal 102. The transmission filter 64T passes a transmission signal in the transmission band of the communication band D among transmission signals amplified by the power amplifier 12.

The reception filter 64R is disposed on a reception path that connects the low-noise amplifier 22 and the antenna connection terminal 102. The reception filter 64R passes a reception signal in the reception band of the communication band D among reception signals input from the antenna connection terminal 102.

The switch 32 is disposed on a transmission path that connects the power amplifier 12 and each of the transmission filters 63T and 64T and switches between the connection between the power amplifier 12 and the transmission filter 63T and the connection between the power amplifier 12 and the transmission filter 64T. The switch 32 includes, for example, an SPDT switching circuit having a common terminal connected to the power amplifier 12, one of selection terminals connected to the transmission filter 63T, and the other selection terminal connected to the transmission filter 64T.

The switch 42 is disposed on a reception path that connects the low-noise amplifier 22 and each of the reception filters 63R and 64R and switches between the connection between the low-noise amplifier 22 and the reception filter 63R and the connection between the low-noise amplifier 22 and the reception filter 64R. The switch 42 includes, for example, an SPDT switching circuit having a common terminal connected to the low-noise amplifier 22, one of selection terminals connected to the reception filter 63R, and the other selection terminal connected to the reception filter 64R.

The switch 72 switches between the connection between the antenna 2 and the duplexer 63 and the connection between the antenna 2 and the duplexer 64. The switch 72 includes, for example, an SPDT switching circuit having a common terminal connected to the antenna connection terminal 102, one of selection terminals connected to the duplexer 63, and the other selection terminal connected to the duplexer 64. The switch 72 can disable the transmission of a radio frequency signal to the second band circuit 1B under a condition the common terminal thereof is connected to none of the selection terminals thereof. That is, the switch 72 may function as an antenna switch that switches between the connection and disconnection between the second band circuit 1B and the antenna 2.

In the second band circuit 1B, the number of supportable communication bands is not limited two, and may be one or three or more. The number of duplexers and the necessity or unnecessity of each switch are determined in accordance with the number of communication bands.

[1.2.3 Circuit Configuration of Third Band Circuit 1C]

Next, the circuit configuration of the third band circuit 1C will be described. The third band circuit 1C includes the power amplifier 13, the low-noise amplifier 23, duplexers 65 and 66, switches 33, 43, and 73.

The power amplifier 13 is an example of a third transmission amplifier and is a transmission power amplifier that amplifies a transmission signal in the third communication band group. The low-noise amplifier 23 is an example of a third reception amplifier and is a reception low-noise amplifier that amplifies a reception signal in the third communication band group with low noise.

The duplexer 65 passes a radio frequency signal in one (hereinafter referred to as "communication band E") of the multiple third communication bands included in the third communication band group. The duplexer 65 includes a transmission filter 65T and a reception filter 65R. The transmission filter 65T is disposed on a transmission path that connects the power amplifier 13 and the antenna connection terminal 103 and passes a transmission signal in the transmission band of the communication band E among transmission signals amplified by the power amplifier 13. The reception filter 65R is disposed on a reception path that connects the low-noise amplifier 23 and the antenna connection terminal 103 and passes a reception signal in the reception band of the communication band E among reception signals input from the antenna connection terminal 103.

The duplexer 66 passes a radio frequency signal in one (hereinafter referred to as "communication band F") of the multiple third communication bands included in the third communication band group. The duplexer 66 includes a transmission filter 66T and a reception filter 66R.

The transmission filter 66T is disposed on a transmission path that connects the power amplifier 13 and the antenna connection terminal 103. The transmission filter 66T passes a transmission signal in the transmission band of the communication band F among transmission signals amplified by the power amplifier 13.

The reception filter 66R is disposed on a reception path that connects the low-noise amplifier 23 and the antenna connection terminal 103. The reception filter 66R passes a reception signal in the reception band of the communication band F among reception signals input from the antenna connection terminal 103.

The switch 33 is disposed on a transmission path that connects the power amplifier 13 and each of the transmission filters 65T and 66T and switches between the connection between the power amplifier 13 and the transmission filter 65T and the connection between the power amplifier 13 and the transmission filter 66T. The switch 33 includes, for example, an SPDT switching circuit having a common terminal connected to the power amplifier 13, one of selection terminals connected to the transmission filter 65T, and the other selection terminal connected to the transmission filter 66T.

The switch 43 is disposed on a reception path that connects the low-noise amplifier 23 and each of the reception filters 65R and 66R and switches between the connection between the low-noise amplifier 23 and the reception filter 65R and the connection between the low-noise amplifier 23 and the reception filter 66R. The switch 43 includes, for example, an SPDT switching circuit having a common terminal connected to the low-noise amplifier 23, one of selection terminals connected to the reception filter 65R, and the other selection terminal connected to the reception filter 66R.

The switch 73 switches between the connection between the antenna 2 and the duplexer 65 and the connection between the antenna 2 and the duplexer 66. The switch 73 includes, for example, an SPDT switching circuit having a common terminal connected to the antenna connection terminal 103, one of selection terminals connected to the duplexer 65, and the other selection terminal connected to the duplexer 66. The switch 73 can disable the transmission of a radio frequency signal to the third band circuit 1C under a condition the common terminal thereof is connected to none of the selection terminals thereof. That is, the switch 73 may function as an antenna switch that switches between the connection and disconnection between the third band circuit 1C and the antenna 2.

In the third band circuit 1C, the number of supportable communication bands is not limited two, and may be one or three or more. The number of duplexers and the necessity or unnecessity of each switch are determined in accordance with the number of communication bands.

In the above switches 31 to 33 in the radio frequency module 1, the state is allowed in which the power amplifier 11 is connected to the transmission filter 61T or 62T and the power amplifier 13 is connected to the transmission filter 65T or 66T. That is, the switches 31 and 33 enable the simultaneous connection of the power amplifiers 11 and 13 to different transmission filters. On the other hand, in the switches 31 to 33, the state is prohibited in which the power amplifier 11 and/or the power amplifier 13 is/are connected to respective transmission filters and the power amplifier 12 is connected to the transmission filter 63T or 64T.

In the switches 41 to 43, the state is allowed in which the low-noise amplifier 21 is connected to the reception filter 61R or 62R and the low-noise amplifier 23 is connected to the reception filter 65R or 66R. That is, the switches 41 to 43 enable the simultaneous connection of the low-noise amplifiers 21 and 23 to different reception filters. On the other hand, for the switches 41 to 43, the state is prohibited in which the low-noise amplifier 21 and/or the low-noise amplifier 23 is/are connected to respective reception filters and the low-noise amplifier 22 is simultaneously connected to the reception filter 63R or 64R.

In the switches 71 to 73, the state is allowed in which the first band circuit 1A and the third band circuit 1C are connected to the antenna 2. That is, the switches 71 and 73 enable the simultaneous connection of the first band circuit 1A and the third band circuit 1C to the antenna 2. On the other hand, in the switches 71 to 73, the state is prohibited in which the first band circuit 1A and/or the third band circuit 1C is/are connected to the antenna 2 and the second band circuit 1B is connected to the antenna 2.

In the radio frequency module 1, the switches 31 to 33 may be formed as the single switching circuit 30. In this case, the switching circuit 30 becomes a multiple-connection switching circuit capable of simultaneously establishing the connection of the power amplifier 11 to the transmission filter 61T or 62T and the connection of the power amplifier 13 to the transmission filter 65T or 66T. The switches 41 to 43 may be formed as the single switching circuit 40. In this case, the switching circuit 40 becomes a multiple-connection switching circuit capable of simultaneously establishing the connection of the low-noise amplifier 21 to the reception filter 61R or 62R and the connection of the low-noise amplifier 23 to the reception filter 65R or 66R. The switches 71 to 73 may be formed as the single switching circuit 70. In this case, the switching circuit 70 becomes a multiple-connection switching circuit capable of simultaneously establishing the connection of the first band circuit 1A to the antenna 2 and the connection of the third band circuit 1C to the antenna 2.

Examples of the transmission filters 61T to 66T and the reception filters 61R to 66R include a surface acoustic wave (SAW) filter, an acoustic wave filter using bulk acoustic waves (BAWs), an LC resonator filter, and a dielectric filter.

The number of antennas connected to the radio frequency module 1 may be two or more. In this case, corresponding antennas may be connected to the antenna connection terminals 101 to 103.

Each of the power amplifiers 11 to 13 and the low-noise amplifiers 21 to 23 may include, for example, a field-effect transistor (FET) or a heterojunction bipolar transistor (HBT) which includes, for example, Si-based complementary metal oxide semiconductor (CMOS) or GaAs as a material.

Each of the duplexers 61 to 66 may be a time-division duplexer including a transmission/reception filter and a transmission/reception changeover switch. Also in this case, transmission and reception in different bands included in the same band group can be simultaneously performed. For example, the case is assumed where a transmission signal in the communication band A in the first communication band group and a reception signal in the communication band B in the first communication band group are simultaneously transmitted.

In the radio frequency module 1, the switches 31 to 33, 41 to 43, and 71 to 73, the PA control circuit 34, and the control circuit 90 are optionally included in a radio frequency module according to the disclosure.

The radio frequency module 1 includes both a transmission circuit and a reception circuit, but may include one of them. In this case, the radio frequency module 1 optionally includes the power amplifiers 11 to 13 or the low-noise amplifiers 21 to 23 as part(s) of the radio frequency module 1.

2. Arrangement of Circuit Elements in Radio Frequency Module 1

Next, the arrangement of circuit elements in the radio frequency module 1 having the above configuration will be described in detail with reference to FIGS. 2A and 2B.

Figure 2A:
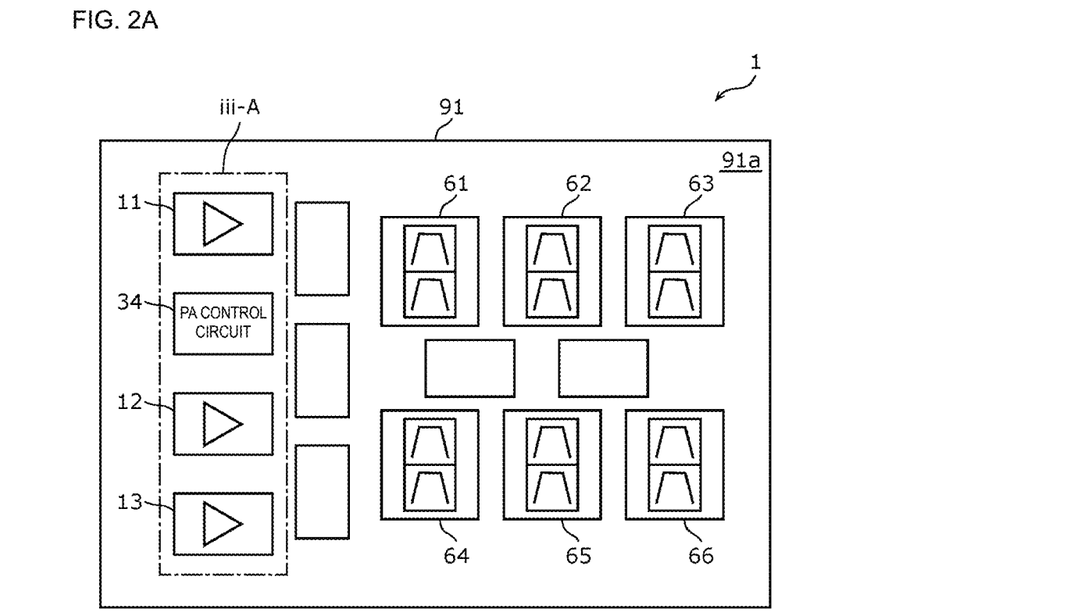
FIG. 2A is a plan view of a radio frequency module according to an embodiment.
Figure 2B:
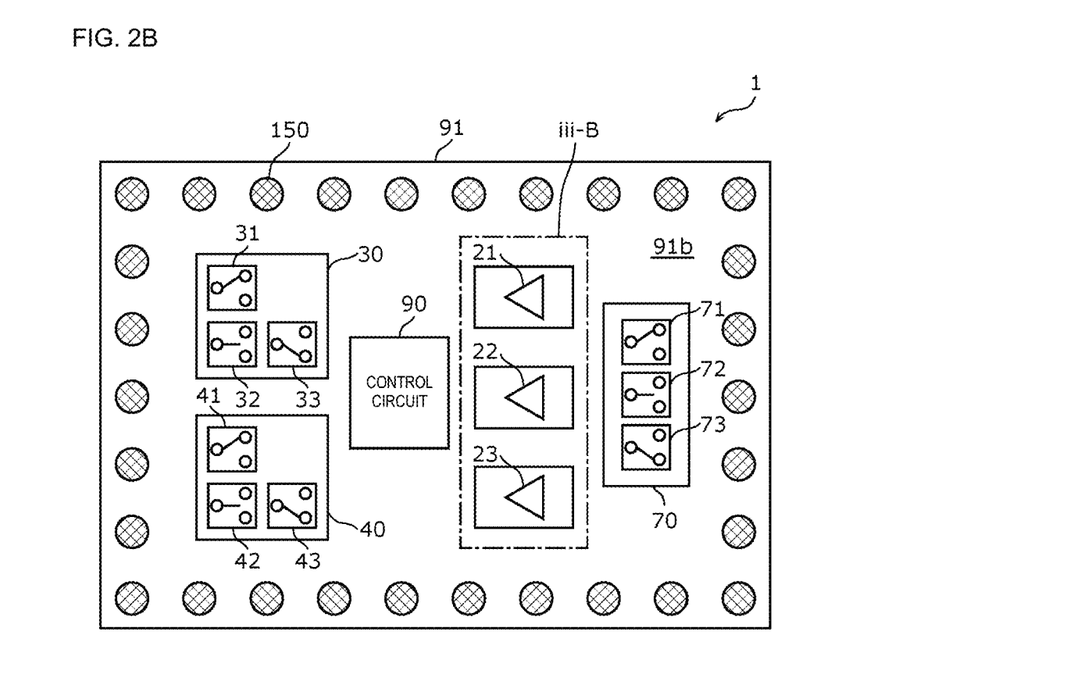
FIG. 2B is a plan view of a radio frequency module according to an embodiment.

FIGS. 2A and 2B are plan views of the radio frequency module 1 according to an embodiment. Specifically, FIG. 2A is a plan view of circuit elements on a principal surface 91a of a substrate 91 in the radio frequency module 1 as viewed from the location of the principal surface 91a. FIG. 2B is a perspective view of circuit elements on a principal surface 91b of the substrate 91 in the radio frequency module 1 as viewed from the location of the principal surface 91a of the substrate 91.

As illustrated in FIGS. 2A and 2B, the radio frequency module 1 further includes the substrate 91 and a plurality of external connection terminals 150 in addition to the circuit configuration illustrated in FIG. 1.

The substrate 91 is a mounting board on which the circuit elements of the radio frequency module 1 are mounted and has the principal surfaces 91a and 91b on opposite sides of the mounting board. Examples of the substrate 91 include a low-temperature co-fired ceramic (LTCC) substrate including the laminate of a plurality of dielectric layers and a printed circuit board.

The principal surfaces 91a and 91b of the substrate 91 are covered with a resin member (not illustrated). The resin member ensures reliability such as the mechanical strength and moisture resistance of the circuit elements on the principal surfaces 91a and 91b. The substrate 91 is optionally covered with a resin member. That is, the resin member is an optional feature of a radio frequency module according to the disclosure.

As illustrated in FIGS. 2A and 2B, the power amplifiers 11 to 13, the PA control circuit 34, and the duplexers 61 to 66 are surface-mounted on the principal surface 91a of the substrate 91. The low-noise amplifiers 21 to 23, the switching circuits 30, 40, 70, and 90 are surface-mounted on the principal surface 91b of the substrate 91. In FIGS. 2A and 2B, blocks with no reference numeral are optional circuit elements.

The multiple external connection terminals 150 are disposed on the principal surface 91b of the substrate 91. The multiple external connection terminals 150 are connected to an external substrate disposed near the principal surface 91b of the radio frequency module 1. The radio frequency module 1 exchanges signals with the external substrate via some of the multiple external connection terminals 150. Some of the multiple external connection terminal 150 are set as the ground potential of the external substrate.

The power amplifiers 11 to 13 are disposed on the principal surface 91a and the low-noise amplifiers 21 to 23, the switching circuits 30, 40, and 70, and the control circuit 90 are disposed on the principal surface 91b, so that the radio frequency module 1 can be entirely reduced in profile. The multiple external connection terminals 150 used as ground electrodes are disposed around the low-noise amplifiers 21 to 23 having large influences upon the reception sensitivity of a reception circuit, so that the degradation in the reception sensitivity of the reception circuit can be suppressed.

Each of the multiple external connection terminals 150 may be a columnar electrode that penetrates a resin member covering the principal surface 91b or a bump electrode disposed on an electrode formed on the principal surface 91b. Under the condition that the external connection terminal 150 is a bump electrode, the principal surface 91b is optionally covered with a resin member.

The arrangement of circuit elements illustrated in FIGS. 2A and 2B is a non-limiting example. For example, the switching circuit 30 may be disposed on the principal surface 91a. For example, the low-noise amplifiers 21 to 23, the switching circuits 30, 40, and 70, and the control circuit 90 may be formed in a single semiconductor IC (integrated circuit). A semiconductor IC is formed of, for example, CMOS. Specifically, a semiconductor IC is formed by an SOI (silicon on insulator) process, so that the cost of manufacturing the semiconductor IC can be reduced. A semiconductor IC may include GaAs, SiGe, or GaN or any combination thereof, so that a radio frequency signal having high-quality amplification performance and noise performance can be output.

[2.1 Arrangement of Power Amplifiers 11 to 13 and PA Control Circuit 34]

Figure 3A:
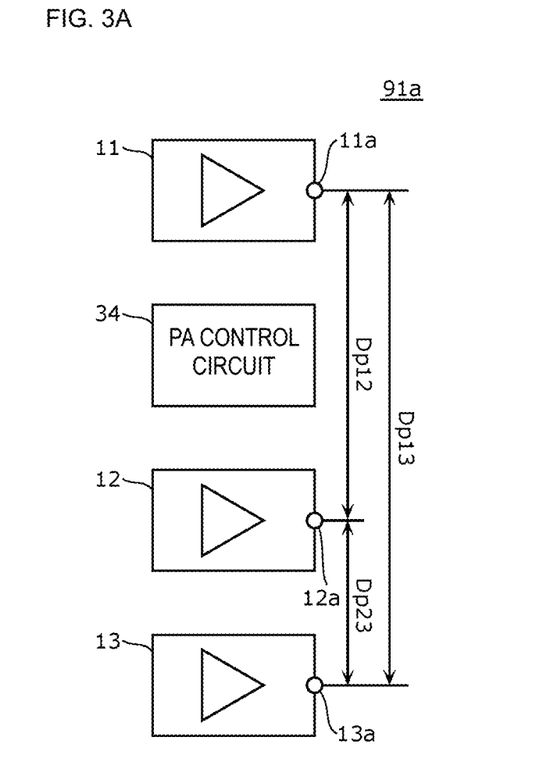
FIG. 3A is a diagram illustrating the arrangement of power amplifiers in a radio frequency module according to an embodiment.

The planar arrangement of the power amplifiers 11 to 13 and the PA control circuit 34 on the principal surface 91a of the substrate 91 will be described in detail with reference to FIG. 3A. FIG. 3A is a diagram illustrating the arrangement of power amplifiers in a radio frequency module according to an embodiment. Specifically, FIG. 3A is an enlarged view of region iii-A in FIG. 2A.

In this embodiment, the power amplifiers 11 to 13 and the PA control circuit 34 are mounted on respective chips and have an equal-sized rectangular outer shape in plan view.

The power amplifiers 11 to 13 and the PA control circuit 34 are arranged in a row at a distance from each other on the principal surface 91a of the substrate 91. The power amplifier 12 and the PA control circuit 34 are located between the power amplifiers 11 and 13. That is, in orthogonal projection onto a plane parallel to the substrate 91, a straight line connecting any point in the power amplifier 11 and any point in the power amplifier 13 passes through the power amplifier 12 and the PA control circuit 34. For example, in orthogonal projection onto a plane parallel to the substrate 91, a straight line connecting an output terminal 11a of the power amplifier 11 and an output terminal 13a of the power amplifier 13 passes through the power amplifier 12 and the PA control circuit 34.

At that time, in plan view of the substrate 91, a distance Dp13 between the output terminal 11a of the power amplifier 11 and the output terminal 13a of the power amplifier 13 is longer than a distance Dp12 between the output terminal 11a of the power amplifier 11 and an output terminal 12a of the power amplifier 12 and a distance Dp23 between the output terminal 12a of the power amplifier 12 and the output terminal 13a of the power amplifier 13. As a distance between output terminals, a distance between any points (e.g., center points) in the output terminals may be used.

The power amplifiers 11 to 13 and the PA control circuit 34 are equal in shape and size in FIG. 3A, but need not be equal in shape and size. Furthermore, the respective shapes of the power amplifiers 11 to 13 and the PA control circuit 34 are not limited to rectangles.

[2.2 Arrangement of Low-Noise Amplifiers 21 to 23]

Figure 3B:
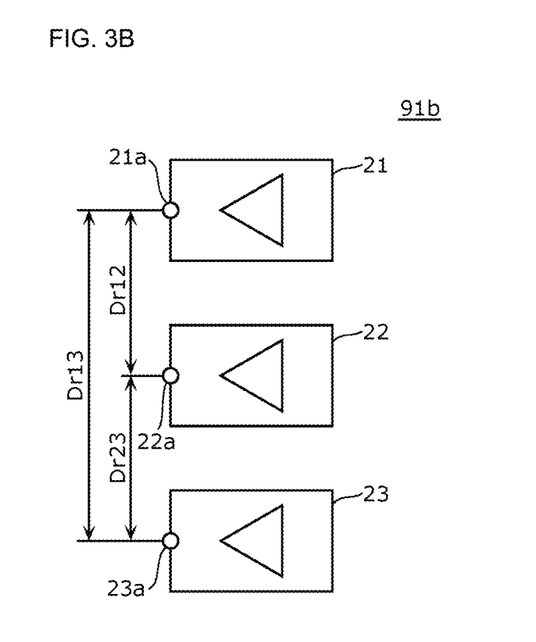
FIG. 3B is a diagram illustrating the arrangement of low-noise amplifiers in a radio frequency module according to an embodiment.

Next, the planar arrangement of the low-noise amplifiers 21 to 23 on the principal surface 91b of the substrate 91 will be described with reference to FIG. 3B. FIG. 3B is a diagram illustrating the arrangement of low-noise amplifiers in a radio frequency module according to an embodiment. Specifically, FIG. 3B is an enlarged view of region iii-B in FIG. 2B.

In this embodiment, the low-noise amplifiers 21 to 23 are mounted on respective chips and have an equal-sized rectangular outer shape in plan view.

The low-noise amplifiers 21 to 23 are arranged in a row at a distance from each other on the principal surface 91b of the substrate 91. The low-noise amplifier 22 is located between the low-noise amplifiers 21 and 23. That is, in orthogonal projection onto a plane parallel to the substrate 91, a straight line connecting any point in the low-noise amplifier 21 and any point in the low-noise amplifier 23 passes through the low-noise amplifier 22. For example, in orthogonal projection onto a plane parallel to the substrate 91, a straight line connecting an output terminal 21a of the low-noise amplifier 21 and an output terminal 23a of the low-noise amplifier 23 passes through the low-noise amplifier 22.

At that time, in plan view of the substrate 91, a distance Dr13 between the output terminal 21a of the low-noise amplifier 21 and the output terminal 23a of the low-noise amplifier 23 is longer than a distance Dr12 between the output terminal 21a of the low-noise amplifier 21 and an output terminal 22a of the low-noise amplifier 22 and a distance Dr23 between the output terminal 22a of the low-noise amplifier 22 and the output terminal 23a of the low-noise amplifier 23.

The low-noise amplifiers 21 to 23 are equal in shape and size in FIG. 3B, but need not be equal in shape and size. Furthermore, the respective shapes of the low-noise amplifiers 21 to 23 are not limited to rectangles.

3. Effects, Etc.

As described above, the radio frequency module 1 according to this embodiment includes the substrate 91, the power amplifier 11 that is mounted on the substrate 91 and that amplifies a transmission signal in a first communication band, the power amplifier 12 that is mounted on the substrate 91 and that amplifies a transmission signal in a second communication band, and the power amplifier 13 that is mounted on the substrate 91 and that amplifies a transmission signal in a third communication band. Simultaneous transmission can be performed in a combination of the first communication band and the third communication band. Simultaneous transmission cannot be performed in a combination of the first communication band and the second communication band and a combination of the second communication band and the third communication band. In plan view of the substrate 91, the distance Dp13 between the output terminal 11a of the power amplifier 11 and the output terminal 13a of the power amplifier 13 is longer than the distance Dp12 between the output terminal 11a of the power amplifier 11 and the output terminal 12a of the power amplifier 12 and the distance Dp23 between the output terminal 12a of the power amplifier 12 and the output terminal 13a of the power amplifier 13.

With this configuration, the distance between the output terminal 11a of the power amplifier 11 and the output terminal 13a of the power amplifier 13 can be increased. Accordingly, under a condition a transmission signal in the first communication band and a transmission signal in the third communication band are simultaneously transmitted, the mutual interference between the transmission signal of high power in the first communication band amplified by the power amplifier 11 and the transmission signal of high power in the third communication band amplified by the power amplifier 13 can be suppressed. That is, the degree of isolation between the transmission circuit for the first communication band and the transmission circuit for the third communication band can be increased. Simultaneous transmission cannot be performed in the combination of the first communication band and the second communication band and the combination of the second communication band and the third communication band. Accordingly, even if a transmission signal in the first communication band and a transmission signal in the third communication band flow into the transmission circuit for the second communication band because of the smallness of the distance Dp12 between the output terminal 11a of the power amplifier 11 and the output terminal 12a of the power amplifier 12 and the smallness of the distance Dp23 between the output terminal 12a of the power amplifier 12 and the output terminal 13a of the power amplifier 13, the transmission of a transmission signal in the second communication band is not affected. That is, in the radio frequency module 1, the degree of isolation between the transmission circuit for the first communication band and the transmission circuit for the third communication band can be increased while the reduction in quality of a transmission signal in the second communication band is prevented.

In the radio frequency module 1 according to this embodiment, the power amplifier 12 may be disposed between the power amplifiers 11 and 13 in the plan view of the substrate 91.

With this configuration in which the power amplifier 12 is interposed between the power amplifiers 11 and 13, the signal interference between the power amplifiers 11 and 13 can be suppressed. Furthermore, the power amplifiers 11 to 13 can be effectively disposed while the conditions of distances among the output terminals of the power amplifiers 11 to 13 are satisfied. This can also contribute to the miniaturization of the radio frequency module 1.

The radio frequency module 1 according to this embodiment may further include the PA control circuit 34 that is mounted on the substrate 91 and that controls the power amplifiers 11 to 13. In this case, the PA control circuit 34 may be disposed between the power amplifiers 11 and 13 in plan view of the substrate 91.

With this configuration in which the PA control circuit 34 is interposed between the power amplifiers 11 and 13, the signal interference between the power amplifiers 11 and 13 can be suppressed. Furthermore, the PA control circuit 34 can be effectively disposed while the distance between the output terminal 11a of the power amplifier 11 and the output terminal 13a of the power amplifier 13 is ensured. This can also contribute to the miniaturization of the radio frequency module 1.

The radio frequency module 1 according to this embodiment includes the substrate 91, the low-noise amplifier 21 that is mounted on the substrate 91 and that amplifies a reception signal in a first communication band, the low-noise amplifier 22 that is mounted on the substrate 91 and that amplifies a reception signal in a second communication band, and the low-noise amplifier 23 that is mounted on the substrate 91 and that amplifies a reception signal in a third communication band. Simultaneous reception can be performed in a combination of the first communication band and the third communication band. Simultaneous reception cannot be performed in a combination of the first communication band and the second communication band and a combination of the second communication band and the third communication band. In plan view of the substrate 91, the distance Dr13 between the output terminal 21a of the low-noise amplifier 21 and the output terminal 23a of the low-noise amplifier 23 is longer than the distance Dr12 between the output terminal 21a of the low-noise amplifier 21 and the output terminal 22a of the low-noise amplifier 22 and the distance Dr23 between the output terminal 22a of the low-noise amplifier 22 and the output terminal 23a of the low-noise amplifier 23.

With this configuration, the distance between the output terminal 21a of the low-noise amplifier 21 and the output terminal 23a of the low-noise amplifier 23 can be increased. Accordingly, under a condition a reception signal in the first communication band and a reception signal in the third communication band are simultaneously received, the mutual interference between the reception signal in the first communication band amplified by the low-noise amplifier 21 and the reception signal in the third communication band amplified by the low-noise amplifier 23 can be suppressed. That is, the degree of isolation between the reception circuit for the first communication band and the reception circuit for the third communication band can be increased. Simultaneous reception cannot be performed in the combination of the first communication band and the second communication band and the combination of the second communication band and the third communication band. Accordingly, even if a reception signal in the first communication band and a reception signal in the third communication band flow into the reception circuit for the second communication band because of the smallness of the distance Dr12 between the output terminal 21a of the low-noise amplifier 21 and the output terminal 22a of the low-noise amplifier 22 and the smallness of the distance Dr23 between the output terminal 22a of the low-noise amplifier 22 and the output terminal 23a of the low-noise amplifier 23, the transmission of a reception signal in the second communication band is not affected. That is, in the radio frequency module 1, the degree of isolation between the reception circuit for the first communication band and the reception circuit for the third communication band can be increased while the reduction in quality of a reception signal in the second communication band is prevented.

(Modifications)

Next, a modification will be described. This modification differs from the above embodiment in that the power amplifiers 12 and 13 are formed on a single chip. The radio frequency module 1 according to this modification will be described focusing on differences from the above embodiment.

Figure 4:
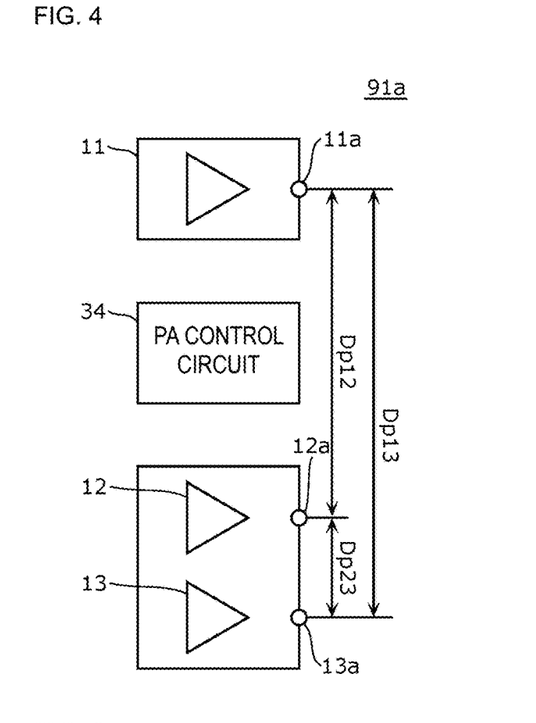
FIG. 4 is a diagram illustrating the arrangement of power amplifiers in a radio frequency module according to a modification.

FIG. 4 is a diagram illustrating the arrangement of power amplifiers in the radio frequency module 1 according to a modification.

In this modification, the power amplifiers 12 and 13 are formed on a single chip. The power amplifiers 11 and 13 are formed on different chips.

The formation of a plurality of circuit elements on a single chip means that the multiple circuit elements are integrated on a single semiconductor substrate. In contrast, the formation of a plurality of circuit elements on different chips means that the multiple circuit elements are mounted on separate semiconductor substrates.

Also, in the case illustrated in FIG. 4 where the power amplifiers 12 and 13 are formed on a single chip, the distance Dp13 between the output terminal 11a of the power amplifier 11 and the output terminal 13a of the power amplifier 13 is longer than the distance Dp12 between the output terminal 11a of the power amplifier 11 and the output terminal 12a of the power amplifier 12 in plan view of the substrate 91 like in the above embodiment.

As described above, in the radio frequency module 1 according to this modification, the power amplifiers 12 and 13 are formed on a single chip.

With this configuration, the footprints of the power amplifiers 12 and 13 can be reduced while the conditions of distances among the output terminals of the power amplifiers 11 to 13 are satisfied. This can contribute to the miniaturization of the radio frequency module 1.

In the radio frequency module 1 according to this modification, the power amplifiers 11 and 13 are formed on different chips.

With this configuration in which the power amplifiers 11 and 13 are not formed on a single chip, the reduction in the degree of isolation between the transmission circuit for the first communication band and the transmission circuit for the third communication band can be prevented.

Although the power amplifiers 11 to 13 have been described in this modification, the low-noise amplifiers 21 to 23 can also be similarly configured. That is, the low-noise amplifiers 22 and 23 can be formed on a single chip. At that time, the low-noise amplifiers 21 and 23 may be formed on different chips.

Other Embodiments

A radio frequency module according to an aspect of the disclosure and a communication device according to an aspect of the disclosure have been described above through the exemplification of the embodiment and the modifications, but are not limited to the above embodiment and the above modifications. The disclosure also includes other embodiments achieved by combining optional constituent elements of the above embodiment and the above modifications, modifications obtained by making various changes, which are conceived by those skilled in the art, to the above embodiment and the above modifications without departing from the spirit and scope of the disclosure, and various apparatuses including the above radio frequency module and the above communication device.

For example, in the radio frequency module 1 and the communication device 5 according to the above embodiment and the above modifications, other circuit elements and other wiring lines may be inserted between the illustrated circuit elements and between the illustrated paths each connecting signal paths. For example, an impedance matching circuit may be inserted between a duplexer and a power amplifier and/or between a duplexer and a low-noise amplifier.

Figure 5:
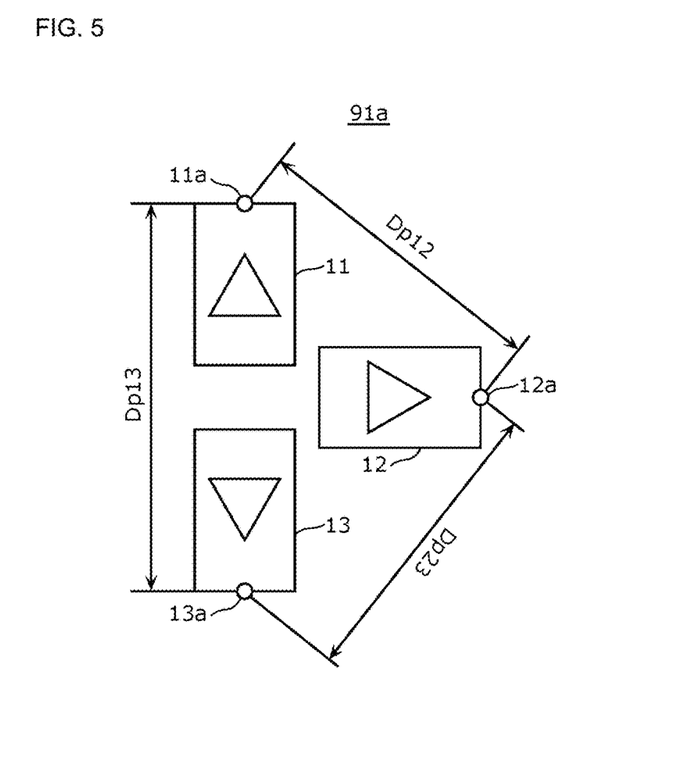
FIG. 5 is a diagram illustrating the arrangement of power amplifiers in a radio frequency module according to another embodiment.

The power amplifier 12 is disposed between the power amplifiers 11 and 13 in the above embodiment and the above modifications, but need not be disposed between them. For example, the power amplifiers 11 to 13 may be disposed as illustrated in FIG. 5. Referring to FIG. 5, the power amplifiers 11 and 13 are disposed to face each other and the output terminals 11a and 13a are located on the two respective sides opposite the two facing sides of the power amplifiers 11 and 13. The power amplifier 12 is not disposed between the power amplifiers 11 and 13 but next to the power amplifiers 11 and 13. Even in the case where the power amplifiers 11 to 13 are disposed as above, the distance Dp13 between the output terminal 11a of the power amplifier 11 and the output terminal 13a of the power amplifier 13 can be larger than the distance Dp12 between the output terminal 11a of the power amplifier 11 and the output terminal 12a of the power amplifier 12 in plan view of the substrate 91 like in the above embodiment.

The power amplifiers 11 to 13 are disposed on the same principal surface of the substrate 91 in the above embodiment and the above modifications, but need not be disposed on the same principal surface of the substrate 91. On condition that the positional relationship among the power amplifiers 11 to 13 in plan view is maintained, one of the power amplifiers 11 to 13 may be disposed on a principal surface different from a principal surface on which the other two of them are disposed. For example, the power amplifier 11 may be disposed on a principal surface different from a principal surface on which the power amplifiers 12 and 13 are disposed. A part of or the whole of each of the power amplifiers 11 to 13 may be disposed in the substrate 91. A similar thing can be applied to the low-noise amplifiers 21 to 23.

INDUSTRIAL APPLICABILITY

The disclosure can be used as a radio frequency module disposed in a multiband front-end portion and is widely applicable to communication devices such as mobile phones each including the radio frequency module.

REFERENCE SIGNS LIST 1 radio frequency module
1A first band circuit
1B second band circuit
1C third band circuit
2 antenna
3 RFIC
4 BBIC
5 communication device
11, 12, and 13 power amplifier
11a, 12a, 13a, 21a, 22a, and 23a output terminal
21, 22, and 23 low-noise amplifier
30, 40, 70 switching circuit
31, 32, 33, 41, 42, 43, 71, 72, and 73 switch
61, 62, 63, 64, 65, and 66 duplexer
61R, 62R, 63R, 64R, 65R, and 66R reception filter
61T, 62T, 63T, 64T, 65T, and 66T transmission filter
91 substrate
91a and 91b principal surface
101, 102, and 103 antenna connection terminal
111, 112, and 113 transmission input terminal
121, 122, and 123 reception output terminal
150 external connection terminal

The invention claimed is:

1. A radio frequency module comprising:
a substrate;
a first transmission amplifier that is mounted on the substrate and that amplifies a first transmission signal in a first communication band;
a second transmission amplifier that is mounted on the substrate and that amplifies a second transmission signal in a second communication band;
a third transmission amplifier that is mounted on the substrate and that amplifies a third transmission signal in a third communication band; and
circuitry configured to
enable simultaneous transmission in the first communication band and in the third communication band,
prevent simultaneous transmission in the first communication band and the second communication band, and
prevent simultaneous transmission in second communication band and in the third communication band, and
in plan view of the substrate, a distance between an output terminal of the first transmission amplifier and an output terminal of the third transmission amplifier is longer than a distance between the output terminal of the first transmission amplifier and an output terminal of the second transmission amplifier as well as a distance between the output terminal of the second transmission amplifier and the output terminal of the third transmission amplifier.

2. The radio frequency module according to claim 1, wherein, in the plan view of the substrate, the second transmission amplifier is disposed between the first transmission amplifier and the third transmission amplifier.

3. The radio frequency module according to claim 2, wherein the circuitry comprising:
a controller that is mounted on the substrate and is configured to control the first transmission amplifier, the second transmission amplifier, and the third transmission amplifier,
the controller being disposed between the first transmission amplifier and the third transmission amplifier in plan view of the substrate.

4. The radio frequency module according to claim 1, wherein the second transmission amplifier and the third transmission amplifier are subcomponents of a single chip.

5. The radio frequency module according to claim 4, wherein the first transmission amplifier is a subcomponent of a first chip, and the third transmission amplifier is a subcomponent of a different chip.

6. The radio frequency module according to claim 4, wherein the circuitry comprising:
a controller that is mounted on the substrate and is configured to control the first transmission amplifier, the second transmission amplifier, and the third transmission amplifier,
the controller being disposed between the first transmission amplifier and the third transmission amplifier in plan view of the substrate.

7. The radio frequency module according to claim 1, wherein the circuitry comprising:
a controller that is mounted on the substrate and configured to control the first transmission amplifier, the second transmission amplifier, and the third transmission amplifier,
the controller being disposed between the first transmission amplifier and the third transmission amplifier in plan view of the substrate.

8. A radio frequency module comprising:
a substrate;
a first reception amplifier that is mounted on the substrate and that amplifies a first reception signal in a first communication band;
a second reception amplifier that is mounted on the substrate and that amplifies a second reception signal in a second communication band;
a third reception amplifier that is mounted on the substrate and that amplifies a third reception signal in a third communication band; and
circuitry configured to
enable simultaneous reception in the first communication band and in the third communication band,
prevent simultaneous reception in the first communication band and the second communication band, or prevent simultaneous reception in the second communication band and in the third communication band, and wherein, in plan view of the substrate, a distance between an output terminal of the first reception amplifier and an output terminal of the third reception amplifier is longer than a distance between the output terminal of the first reception amplifier and an output terminal of the second reception amplifier as well as a distance between the output terminal of the second reception amplifier and the output terminal of the third reception amplifier.

9. The radio frequency module according to claim 8, further comprising:
a first transmission amplifier that is mounted on the substrate and that amplifies a first transmission signal in the first communication band;
a second transmission amplifier that is mounted on the substrate and that amplifies a second transmission signal in the second communication band; and
a third transmission amplifier that is mounted on the substrate and that amplifies a third transmission signal in the third communication band, wherein
the circuitry is further configured to
enable simultaneous transmission in the first communication band and in the third communication band,
prevent simultaneous transmission in the first communication band and the second communication band, and prevent simultaneous transmission in second communication band and in the third communication band, and
in plan view of the substrate, a distance between an output terminal of the first transmission amplifier and an output terminal of the third transmission amplifier is longer than a distance between the output terminal of the first transmission amplifier and an output terminal of the second transmission amplifier as well as a distance between the output terminal of the second transmission amplifier and the output terminal of the third transmission amplifier.

10. The radio frequency module according to claim 9, wherein, in the plan view of the substrate, the second transmission amplifier is disposed between the first transmission amplifier and the third transmission amplifier.

11. The radio frequency module according to claim 9, wherein the second transmission amplifier and the third transmission amplifier are subcomponents of a single chip.

12. The radio frequency module according to claim 11, wherein the first transmission amplifier is a subcomponent of a first chip, and the third transmission amplifier is a subcomponent of a different chip.

13. The radio frequency module according to claim 11, wherein the circuitry comprising:
a controller that is mounted on the substrate and configured to control the first transmission amplifier, the second transmission amplifier, and the third transmission amplifier,
the controller being disposed between the first transmission amplifier and the third transmission amplifier in plan view of the substrate.

14. A communication device comprising:
a radio frequency module that conveys a radio frequency signal between an antenna and a signal processing circuit; and
the signal processing circuit that processes the radio frequency signal that is provided by the antenna, or provided to the antenna, wherein the radio frequency module includes a substrate,
a first transmission amplifier that is mounted on the substrate and that amplifies a first transmission signal in a first communication band,
a second transmission amplifier that is mounted on the substrate and that amplifies a second transmission signal in a second communication band,
a third transmission amplifier that is mounted on the substrate and that amplifies a third transmission signal in a third communication band, and
circuitry configured to
enable simultaneous transmission in the first communication band and in the third communication band,
prevent simultaneous transmission in the first communication band and the second communication band, and prevent simultaneous transmission in second communication band and in the third communication band, and
in plan view of the substrate, a distance between an output terminal of the first transmission amplifier and an output terminal of the third transmission amplifier is longer than a distance between the output terminal of the first transmission amplifier and an output terminal of the second transmission amplifier as well as a distance between the output terminal of the second transmission amplifier and the output terminal of the third transmission amplifier.

15. The communication device of claim 14, wherein in the plan view of the substrate, the second transmission amplifier is disposed between the first transmission amplifier and the third transmission amplifier.

16. The communication device of claim 14, wherein the second transmission amplifier and the third transmission amplifier are subcomponents of a single chip.

17. The communication device of claim 16, wherein the first transmission amplifier is a subcomponent of a first chip, and the third transmission amplifier is a subcomponent of a different chip.

18. The communication device of claim 14, wherein the circuitry of the radio frequency module further comprising:
a controller that is mounted on the substrate and configured to control the first transmission amplifier, the second transmission amplifier, and the third transmission amplifier,
the controller being disposed between the first transmission amplifier and the third transmission amplifier in plan view of the substrate.

19. The communication device of claim 14, wherein the radio frequency module further comprising:
a first reception amplifier that is mounted on the substrate and that amplifies a first reception signal in the first communication band;
a second reception amplifier that is mounted on the substrate and that amplifies a second reception signal in the second communication band; and
a third reception amplifier that is mounted on the substrate and that amplifies a third reception signal in the third communication band, wherein
the circuitry is further configured to
enable simultaneous reception in the first communication band and in the third communication band,
prevent simultaneous reception in the first communication band and the second communication band, or prevent simultaneous reception in the second communication band and in the third communication band, and
in plan view of the substrate, a distance between an output terminal of the first reception amplifier and an output terminal of the third reception amplifier is longer than a distance between the output terminal of the first reception amplifier and an output terminal of the second reception amplifier as well as a distance between the output terminal of the second reception amplifier and the output terminal of the third reception amplifier.

* * * * *